(12) United States Patent
Zhang (10) Patent No.: US 11,970,351 B2
(45) Date of Patent: Apr. 30, 2024

(54) BUFFER MATERIAL CONVEYING AND WINDING DEVICE, BUFFER MATERIAL CONVEYING METHOD AND ASSEMBLY BINDING SYSTEM

(71) Applicants: HKC CORPORATION LIMITED, Guangdong (CN); CHONGQING HKC OPTOELECTRONICS TECHNOLOGY CO., LTD., Chongqing (CN)

(72) Inventor: Yang Zhang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 920 days.

(21) Appl. No.: 16/920,389

(22) Filed: Jul. 2, 2020

(65) Prior Publication Data

US 2020/0331720 A1    Oct. 22, 2020

Related U.S. Application Data

(63) Continuation of application No. PCT/CN2018/072849, filed on Jan. 16, 2018.

(30) Foreign Application Priority Data

Jan. 4, 2018    (CN) .................. 201810007831.X (51) Int. Cl.
*B65H 26/06*    (2006.01)
*B65H 18/10*    (2006.01)
*G05B 19/416*    (2006.01)

(52) U.S. Cl.
CPC ........... *B65H 18/103* (2013.01); *B65H 26/06* (2013.01); *G05B 19/4166* (2013.01); *B65H 2515/32* (2013.01); *G05B 2219/34013* (2013.01)

(58) Field of Classification Search
CPC .. B65H 18/103; B65H 26/06; B65H 2515/32; G05B 19/4166
See application file for complete search history.

(56) References Cited

U.S. PATENT DOCUMENTS 4,285,130 A    8/1981   Chandler
4,398,348 A *  8/1983   Bergvall ............... G01D 5/363
                                                         33/735
(Continued)

FOREIGN PATENT DOCUMENTS

CN    101708661 A    5/2010
CN    101817458 A    9/2010
(Continued)

OTHER PUBLICATIONS

Chinese Office Action, dated Jan. 29, 2019, for Chongqing HKC Optoelectronics Technology Co., Ltd. and HKC Corporation Limited, Chinese Application No. 201810007831.X, Filed Jan. 4, 2018.
(Continued)

*Primary Examiner* — Sang K Kim
(74) *Attorney, Agent, or Firm* — Law Offices of Albert Wai-Kit Chan, PLLC; Albert Wai-Kit Chan (57) ABSTRACT

Disclosed are a buffer material conveying and winding device, a buffer material conveying method and an assembly binding system, belonging to the technical field of a chip on glass. The buffer material conveying and winding device comprises a rack, a feed roller, a feed servo motor, a recycling roller, a recycling torque motor, a measuring device, a controller and an alarm. The controller may monitor whether the recycling length meets the requirement
(Continued)

through the measuring device. The buffer material conveying method is based on the buffer material conveying and winding device. The assembly binding system comprises a buffer material conveying and winding device, a buffer material and a pressing head device.

9 Claims, 3 Drawing Sheets

(56) References Cited

U.S. PATENT DOCUMENTS

| | | | | |
|---|---|---|---|---|
| 9,758,332 | B2* | 9/2017 | Uruma | B65H 20/02 |
| 2009/0283565 | A1* | 11/2009 | Ibanez | G01B 21/08 |
| | | | | 702/158 |

FOREIGN PATENT DOCUMENTS

| | | | |
|---|---|---|---|
| CN | 202429766 | U | 9/2012 |
| CN | 203497816 | U | 3/2014 |
| CN | 204643272 | U | 9/2015 |
| CN | 105966961 | A | 9/2016 |
| CN | 205838112 | U | 12/2016 |
| CN | 205973110 | U | 2/2017 |
| CN | 106842643 | A | 6/2017 |
| CN | 206232179 | U | 6/2017 |
| CN | 206720424 | U | 12/2017 |
| JP | H09141596 | A | 6/1997 |

OTHER PUBLICATIONS

International Search Report, dated Sep. 25, 2018, for HKC Corporation Limited et al., International Application No. PCT/CN2018/072849, Filed Jan. 16, 2018.

Written Opinion, dated Sep. 25, 2018, for HKC Corporation Limited et al., International Application No. PCT/CN2018/072849, Filed Jan. 16, 2018.

* cited by examiner

BUFFER MATERIAL CONVEYING AND WINDING DEVICE, BUFFER MATERIAL CONVEYING METHOD AND ASSEMBLY BINDING SYSTEM

CROSS-REFERENCE TO RELATED APPLICATIONS

This application is a continuation application of International Patent Application No. PCT/CN2018/072849 with an international filing date of Jan. 16, 2018, designating the United States, now pending, and further claims priority to Chinese Patent Application No. 201810007831.X filed on Jan. 4, 2018. The contents of all of the aforementioned applications are incorporated herein by reference.

TECHNICAL FIELD

The present application relates to the technical field of a chip on glass, and more particularly relates to a buffer material conveying and winding device, a buffer material conveying method and an assembly binding system having the buffer material conveying and winding device.

BACKGROUND

In the Chip On Glass (COG) pressing process, a certain pressure and high temperature are required to bind the chip to the glass screen. Because of the brittleness of the glass screen, a buffer material is needed during the binding operation. The buffer material is placed between the pressing head and the chip circuit board, and the pressing head is used to fix the chip circuit board to the glass screen. The buffer material plays the role of buffering and uniformly heat conducting.

Due to the limited service life of the buffer material, the buffer material needs to be replaced after pressing several times. At present, the buffer material conveying and winding device winds both ends of the buffer material around the feed roller and the recycling roller, respectively. The used buffer material is removed by rotating the feed roller and the recycling roller, and the uncompressed buffer material is moved to the glass screen to operate. In the prior art, the conveying length fed by the buffer material ever time is implemented by controlling the single time of rotation of the feed servo motor. The conveying length of the buffer material when the feed servo motor is rotated during a single time of rotation is referred to as the feeding length (also referred to as the simulation length). This solution is not sufficient because the feed roller and the recycling roller are loosely wound in different degrees or the diameter of the buffer material wound around the feed roller decreases. Controlling the feeding length of the buffer by controlling the feed servo motor will result in an error in the buffer material conveyed every time, and there is a risk that the buffer material is repeatedly pressed and the buffer material is wasted.

SUMMARY

In view of the above, the present application provides a buffer material conveying and winding device, a buffer material conveying method, and an assembly binding system, so as to prevent the buffer material from being repeatedly pressed due to the fact that there may be errors in the feeding amount of the buffer material conveyed by the feed servo motor during a single time of rotation.

The technical solution adopted by the present application is to provide a buffer material conveying and winding device, which includes: a rack, a feed roller, a feed servo motor, a recycling roller, a recycling torque motor, a measuring device, a controller, and an alarm. The feed roller is fixed to the rack and configured to convey the buffer material. The unused part of the buffer material is wound around the feed roller. The feed servo motor is fixed to the rack and configured to provide rotational power to the feed roller. The recycling roller is fixed to the rack and configured to recycle the buffer material. The used part of the buffer material is wound around the recycling roller. The recycling torque motor is fixed to the rack and configured to provide rotational power to the recycling roller. The recycling torque motor is configured to provide a torque when the recycling torque motor does not rotate or even reversely rotates due to an external force, and the recycling torque motor is configured to rotate and drive the recycling roller to wind and recycle the buffer material when the buffer material is in a relaxed state. The measuring device is connected to the rack and configured to measure the recycling length of the buffer material wound by the recycling roller when the feed servo motor rotates and feeds for a single time. The controller is electrically connected to the measuring device and the feed servo motor and configured to coordinate the operation of the buffer material conveying and winding device to cooperate an operation of chip on glass pressing. The alarm is electrically connected to the controller and configured to prompt the operator in the abnormal situation.

In some embodiments, the measuring device includes: an encoding wheel, an encoder, and a flexible fixing structure. The encoding wheel is elastically abutted against an outermost periphery of the buffer material wound around the recycling roller. The encoding wheel is provided with rotational power by the buffer material, the encoding wheel is in parallel with the recycling roller in an axial direction of the recycling roller, and the encoding wheel and the recycling roller are configured to rotate in opposite directions. The encoder has a rotary shaft connected to the encoding wheel, and the encoder is connected to an input end of the controller. The encoding wheel is driven by the buffer material wound around the recycling roller to rotate, and the recycling length of the buffer material wound by the recycling roller during a single time of rotation is measured by the encoder. One end of the flexible fixing structure is fixedly provided on the rack, and the other end of the flexible fixing structure is elastically connected to the encoder or the encoding wheel. The flexible fixing structure is configured to keep the encoding wheel elastically abutted against the outermost periphery of the buffer material wound around the recycling roller.

In some embodiments, the encoder is a photoelectric encoder or an absolute encoder.

In some embodiments, the flexible fixing structure includes: a telescopic adjusting element and an elastic element. The telescopic adjusting element is fixedly provided on the rack. The telescopic adjusting element has an adjustable length. One end of the elastic element is connected to the telescopic adjusting element, and the other end of the elastic element is connected to the encoding wheel.

In some embodiments, the telescopic adjusting element is a cylinder including a cylinder body and a piston rod. The cylinder body is fixed to the rack, and the piston rod is connected to the elastic element. The flexible fixing structure further includes a control valve configured to control the cylinder to adjust a distance between the encoding wheel and the recycling roller, the control valve is in gas communication with the cylinder, and the control valve is electrically connected to the output end of the controller.

In some embodiments, the control valve is an electrically controlled servo valve.

In some embodiments, the telescopic adjusting element includes a sleeve provided with an internal thread and a stud in threaded connection with the sleeve. The sleeve is fixed to the rack, and the stud is connected to the elastic element.

In some embodiments, the internal thread of the sleeve is a trapezoidal thread, and the stud is a trapezoidal thread stud. Or, the internal thread of the sleeve is a rectangular thread, and the stud is a rectangular threaded stud.

In some embodiments, both the sleeve and the stud are alloy tool steel members, or both the sleeve and the stud are steel members subjected to quenching and tempering treatment.

In some embodiments, the elastic element is a compression spring.

In some embodiments, the controller is a programmable controller provided with a human-computer interactive touch screen.

In some embodiments, the controller is an industrial personal computer provided with a human-computer interactive interface or a single chip microcomputer provided with a human-computer interactive interface.

The present application further provides a buffer material conveying method, applied to the buffer material conveying and winding device as described above, where the buffer material conveying method includes the steps of:

setting, by the controller, a feeding length of a buffer material conveyed by the feed servo motor during a single time of rotation and a size tolerance of the feeding length, where the recycling torque motor is always in a recycling working state;

rotating and conveying, by the feed servo motor, unused buffer material in accordance with the feeding length, winding, by the recycling torque motor, used buffer material, and measuring, by the measuring device, a recycling length of the buffer material wound by the recycling torque motor, when it is necessary to remove the used buffer material; and judging, by the controller, whether a difference between the recycling length and the feeding length meets the size tolerance of the feeding length, and, where: controlling, by the controller, the alarm to send an alarm, if the difference is greater than an upper deviation of the size tolerance or less than a lower deviation of the size tolerance; and waiting for a next cycle of operation, if the difference is within a range of the size tolerance.

In some embodiments, the buffer material conveying method further includes:

controlling, by the controller, the feed servo motor to reversely rotate and pull back the buffer material conveyed excessively, if the difference is greater than the upper deviation of the size tolerance, until the difference is within the range of the size tolerance, controlling the feed servo motor to stop reversely rotating and waiting for a next cycle of operation; and controlling, by the controller, the feed servo motor to continue to convey the buffer material, if the difference is less than the lower deviation of the size tolerance, until the difference is within the range of the size tolerance, controlling the feed servo motor to stop reversely rotating and waiting for a next cycle of operation.

In some embodiments, the measuring device includes: an encoding wheel, an encoder, and a flexible fixing structure. The encoding wheel is elastically abutted against an outermost periphery of the buffer material wound around the recycling roller. The encoding wheel is provided with rotational power by the buffer material, the encoding wheel is in parallel with the recycling roller in an axial direction of the recycling roller, and the encoding wheel and the recycling roller are configured to rotate in opposite directions. The encoder has a rotary shaft connected to the encoding wheel, and the encoder is connected to an input end of the controller. The encoding wheel is driven by the buffer material wound around the recycling roller to rotate, and the recycling length of the buffer material wound by the recycling roller during a single time of rotation is measured by the encoder. One end of the flexible fixing structure is fixedly provided on the rack, and the other end of the flexible fixing structure is elastically connected to the encoder or the encoding wheel. The flexible fixing structure is configured to keep the encoding wheel elastically abutted against the outermost periphery of the buffer material wound around the recycling roller.

In some embodiments, the flexible fixing structure includes: a telescopic adjusting element and an elastic element. The telescopic adjusting element is fixedly provided on the rack. The telescopic adjusting element has an adjustable length. One end of the elastic element is connected to the telescopic adjusting element, and the other end of the elastic element is connected to the encoding wheel.

In some embodiments, the telescopic adjusting element is a cylinder including a cylinder body and a piston rod. The cylinder body is fixed to the rack, and the piston rod is connected to the elastic element. The flexible fixing structure further includes a control valve configured to control the cylinder to adjust a distance between the encoding wheel and the recycling roller. The control valve is in gas communication with the cylinder, and the control valve is electrically connected to an output end of the controller.

In some embodiments, the controller is a programmable controller provided with a human-computer interactive touch screen.

The present application further provides an assembly binding system. The assembly binding system includes: the buffer material conveying and winding device as described above, buffer material, and a pressing head device. One end of the buffer material is wound around the feed roller and the other end of the buffer material is wound around the recycling roller. The controller is electrically connected to the pressing head device.

In some embodiments, the measuring device includes: an encoding wheel, an encoder, and a flexible fixing structure. The encoding wheel is elastically abutted against an outermost periphery of the buffer material wound around the recycling roller. The encoding wheel is provided with rotational power by the buffer material, the encoding wheel is in parallel with the recycling roller in an axial direction of the recycling roller, and the encoding wheel and the recycling roller are configured to rotate in opposite directions. The encoder has a rotary shaft connected to the encoding wheel, and the encoder is connected to an input end of the controller. The encoding wheel is driven by the buffer material wound around the recycling roller to rotate, and the recycling length of the buffer material wound by the recycling roller during a single time of rotation is measured by the encoder. One end of the flexible fixing structure is fixedly provided on the rack, and the other end of the flexible fixing structure is elastically connected to the encoder or the encoding wheel. The flexible fixing structure is configured to keep the encoding wheel elastically abutted against the outermost periphery of the buffer material wound around the recycling roller.

The buffer material conveying and winding system and the assembly binding system of the present application are provided with a measuring device configured to detect the recycling length of the buffer material wound by the recycling roller during a single time of rotation, a controller configured to judge whether the recycling length and the feeding length meet the requirement, and an alarm. The alarm is capable of sending an alarm to prompt the operator when the recycling length and the feeding length do not meet the requirement so as to prevent the buffer material which has passed the service life from being repeatedly pressed and to save the buffer material.

By monitoring the actual recycling length of the buffer material and judging whether the recycling length and the feeding length meet the requirement, the buffer material conveying method of the present application can send an alarm to prompt the operator when the recycling length and the feeding length do not meet the requirement so as to prevent the buffer material which has passed the service life from being repeatedly pressed and to save the buffer material.

BRIEF DESCRIPTION OF THE DRAWINGS

In order to more clearly illustrate the technical solution in embodiments of the present application, the following drawings, which are to be used in the description of the embodiments or the existing techniques, will be briefly described. It will be apparent that the drawings described in the following description are merely embodiments of the present application. Other drawings may be obtained by those skilled in the art without paying creative labor.

DETAILED DESCRIPTION OF THE EMBODIMENTS

In order to make those skilled in the art better understood the technical solutions of the present application, technical solutions in embodiments of the present application are clearly described hereinbelow with reference to accompanying drawings in the embodiments of the present application. It should be understood that the specific embodiments described herein are only used to explain the present application, and are not intended to limit the present application.

It should be noted that when an element is referred to as being "fixed on" or "provided on" another element, the element may be directly located on the other element or indirectly located on the other element. When an element is referred to as being "connected to" another element, the element may be directly connected to the other element or indirectly located on the other element.

It should be understood that the orientation or positional relationship of the terms such as "length", "width", "upper", "lower", "front", "back", "left", "right", "vertical", "horizontal", "top", "bottom", "inner" and "outer" is based on the orientation or positional relationship shown in the accompanying drawings merely for the convenience of describing the present application and a simplified description rather than indicating or implying that the indicated device or element must have a particular orientation, be constructed and operate in a particular orientation. Therefore it cannot be understood as a limitation of the present application.

In the description of the present application, "a plurality of" means two or more unless expressly defined otherwise.

Figure 1:
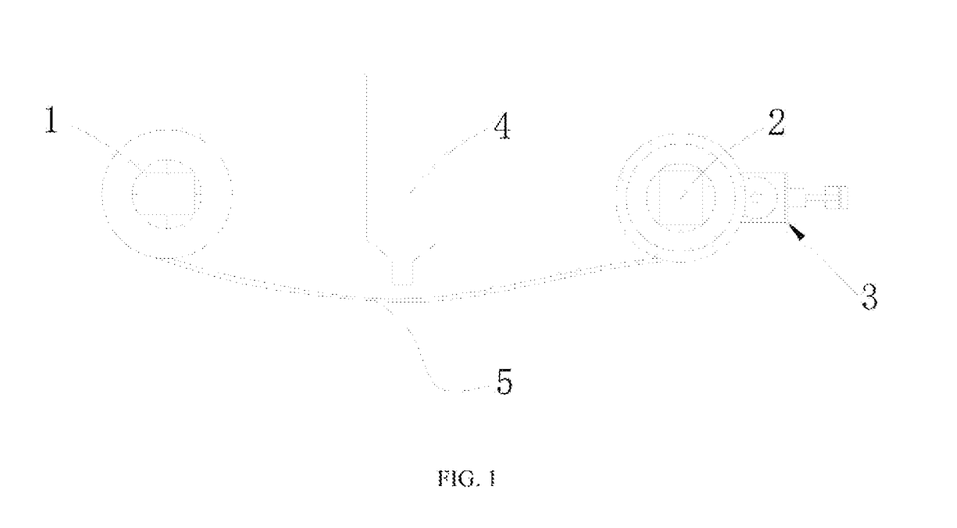
FIG. 1 is a structural schematic view of an assembly binding system provided by some embodiments of the present application.
Figure 2:
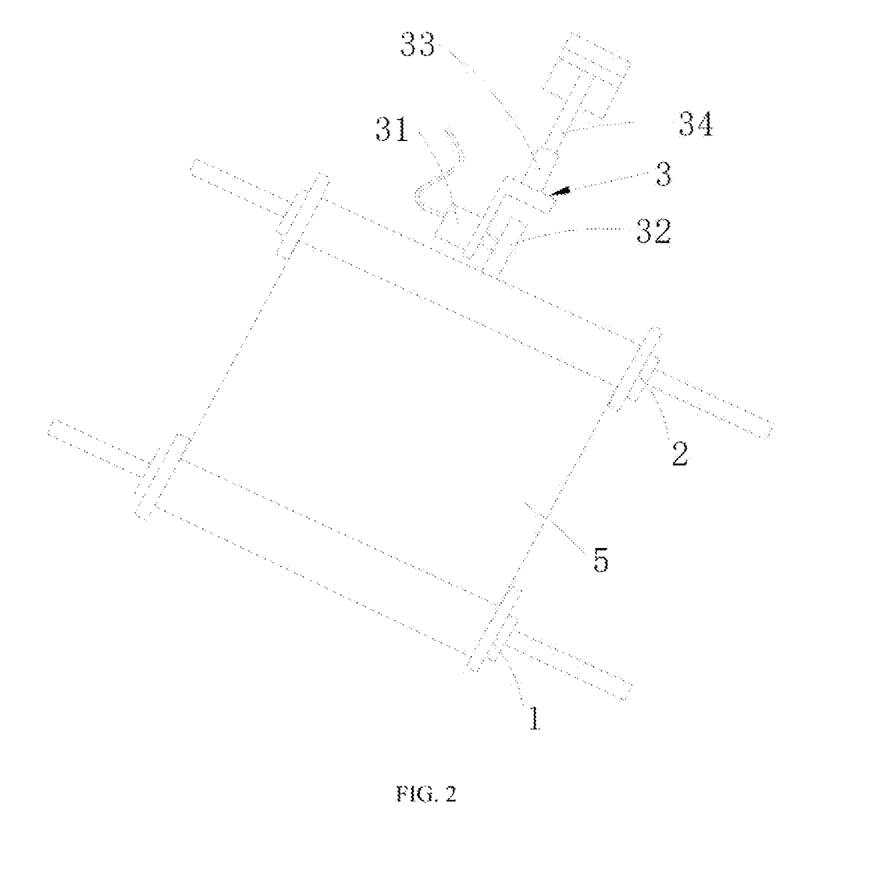
FIG. 2 is a schematic structural view of a buffer material conveying and winding device provided by some embodiments of the present application.
Figure 3:
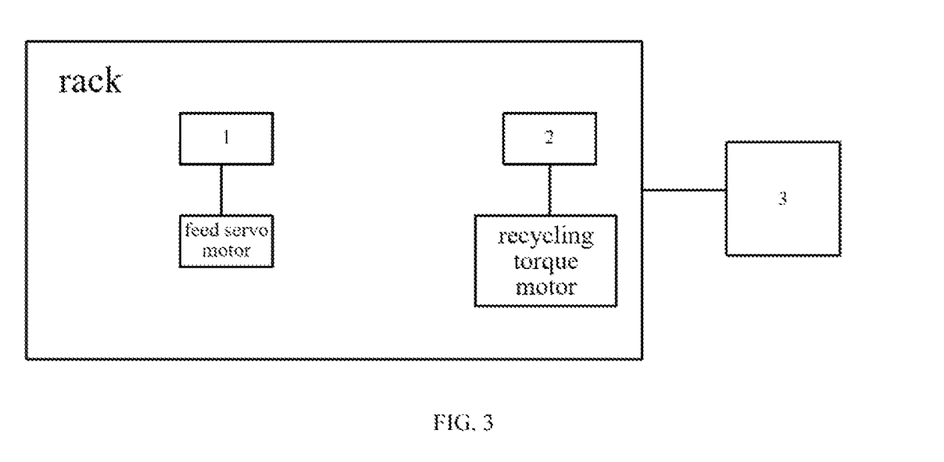
FIG. 3 is a schematic structural view of a rack to which a feed servo motor, a feed roller, a recycling roller, and a recycling torque motor are fixed, and the rack is connected to the measuring device.

Referring to FIG. 1 and FIG. 2, the buffer material conveying and winding device provided by the present application is described. The buffer material conveying and winding device includes: a rack, a feed roller 1, a feed servo motor, a recycling roller 2, a recycling torque motor, a measuring device, a controller and an alarm. Referring to FIG. 1 to FIG. 4, the feed roller 1, the feed servo motor, the recycling roller 2, and the recycling torque motor are all fixed to the rack. The rack is configured as a main frame of the buffer material conveying and winding device and is fixed at the buffer material conveying and winding device.

The feed roller 1 is configured to convey the buffer material 5. The unused part of the buffer material 3 is wound around the feed roller 1.

The feed servo motor is controlled by controller and is configured to provide single time of rotational power to the feed roller feed roller 1.

The recycling roller 2 is configured to recycle the buffer material. The used part of the buffer material 5 is wound around the recycling roller 2.

The recycling torque motor is configured to provide rotational power to the recycling roller 2 and is always in the working state in the conveying process of the whole buffer material. The recycling torque motor mainly drives the recycling roller 2 to recycle the used buffer material and keeps the tension of the buffer material. The recycling torque motor is capable of rotating when the buffer material 5 is in a relaxed state and driving the recycling roller 2 to wind and recycle the buffer material 5. Moreover, the recycling torque motor is capable of locking rotation. The motor locks the rotation, indicates the state that the motor is still capable of providing a torque when the motor does not rotate or even reversely rotates due to the external force. The torque setting value of the recycling torque motor is not large. When the feed roller 1 does not feed and the buffer material 5 is in a tight state, since the torque setting value of the recycling torque motor is relatively small due to non-rotation of the feed servo motor, the recycling torque motor is in a locking rotation state at this time so that the recycling torque motor cannot recycle the buffer material 5. If the feed servo motor drives the feed roller 1 to reversely rotate, the feed roller 1 will pull the buffer material 5 and then drive the recycling roller 2 and the recycling torque motor to reversely rotate. The recycling torque motor is in the locking rotation state of reversely rotating at this time. In this way, the buffer material 5 recycled on the recycling roller 2 is pulled back.

The measuring device 3 is connected to the rack and configured to measure the actual recycling length of the recycling roller 2 winding buffer material 5 when the feed servo motor rotates and feeds for a single time (and also when the recycling torque motor rotates the buffer material 5 for a single time to recycle it). The device 3 may be any device capable of measuring the recycling length, such as a Charge Coupled Device (CCD) visual inspection device, etc., which is not particularly limited in embodiments of the present application.

Figure 4:
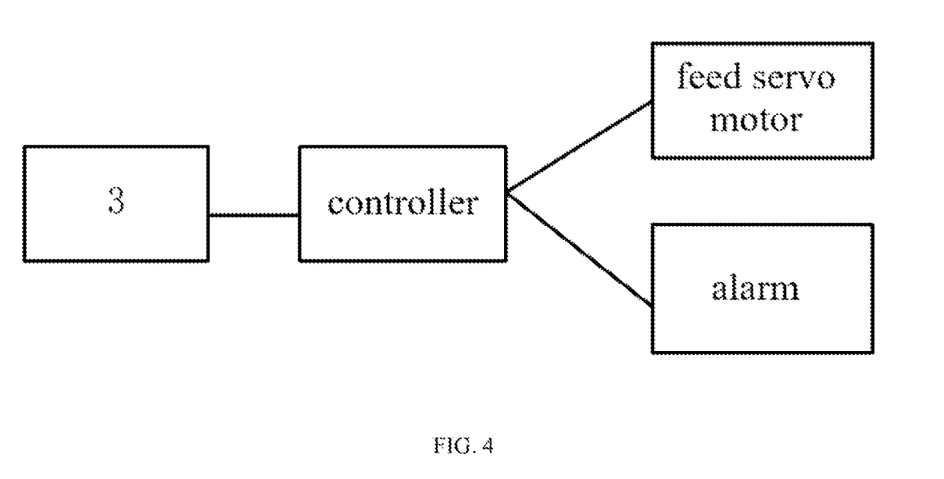
FIG. 4 is a schematic structural view showing the measuring device is connected to an input end of the controller, and an output end of the controller is connected to the feed servo motor and the alarm.

The controller may be a control device such as a conventional Programmable Logic Controller (PLC), a single chip microcomputer or a computer, which is configured to coordinate an operation of the buffer material conveying and winding device to cooperate an-operation of Chip On Glass (COG) pressing, which specifically includes the functions of controlling the single time of rotation of the feed servo motor to convey the buffer material 5, setting the feeding length of the buffer material 5 and the size tolerance of the feeding length, receiving the signal of the measuring apparatus 3 and monitoring the recycling length of the buffer material 5, judging whether the difference between the recycling length and the feeding length meets the size tolerance, controlling the positive and negative rotation of the feed servo motor, and controlling the alarm to send an alarm during abnormal operation. As shown in FIG. 4, the measuring device 3 is electrically connected to the input end of the controller, and the output end of the controller is electrically connected to the feed servo motor and the alarm, respectively.

The working principle of the buffer material conveying and winding device provided by the embodiments of the present application is as follows: firstly, the controller sets the feeding length of the buffer material 5 conveyed by the single time of rotation of the feed servo motor and the size tolerance of the feeding length, and keeps the recycling torque motor always in the recycling working state; when the used buffer material 5 needs to be removed, the feed servo motor rotates according to the feeding length and conveys the unused buffer material 5, the recycling torque motor winds the used buffer material 5, and the measuring device measures the actual recycling length of the recycling torque motor winding buffer material 5.

The controller judges whether the difference between the recycling length and the feeding length meets the size tolerance of the feeding length. The controller controls the alarm to send an alarm if the difference is greater than the upper deviation of the size tolerance or less than the lower deviation of the size tolerance, and the operator searches for the reason for the deviation of the feeding length and the recycling length and makes adjustments or maintenance after receiving the alarm; and waits for the next cycle of operation, if the difference is within the range of the size tolerance.

In addition, the buffer material conveying and winding device provided by the embodiments of the present application may also work as follows when judging whether the difference between the recycling length and the feeding length meets the size tolerance of the feeding length: the controller judges whether the difference between the recycling length and the feeding length meets the size tolerance of the feeding length, the controller controls the feed servo motor to reversely rotate and pull back the buffer material conveyed excessively if the difference is greater than the upper deviation of the size tolerance, the recycling torque motor is also driven to reversely rotate at this time, until the controller judges that the difference between the recycling length and the feeding length after the reversing operation is within the range of the size tolerance by the measuring device, and then the feed servo motor stops reversely rotating and waits for the next cycle of operation. The controller controls the feed servo motor to continue to convey the buffer material, if the difference is less than the lower deviation of the size tolerance, until the difference between the recycling length and the feeding length is within the range of the size tolerance, and then the feed servo motor stops reversely rotating. If the difference is within the range of the size tolerance, the feed servo motor will stop operating and wait for the next cycle of operation.

The buffer material conveying and winding device provided by the present application is provided with a measuring device configured to detect the recycling length of the buffer material wound by the recycling roller during a single time of rotation, a controller configured to judge whether the recycling length and the feeding length meet the requirement, and an alarm. The alarm is capable of sending an alarm to prompt the operator when the recycling length and the feeding length do not meet the requirement so as to avoid the problem that the buffer material which has passed the service life is repeatedly pressed and the buffer material is wasted.

In some embodiments, referring to FIG. 1 and FIG. 2, as a specific implementation of the buffer material conveying and winding device provided by the present application, the measuring device 3 includes an encoding wheel 32, an encoder 31 and a flexible fixing structure.

The encoding wheel 32 is always elastically abutted against an outermost periphery of the buffer material 5 wound around the recycling roller 2, the encoding wheel 32 is in parallel with the recycling roller 2 in an (rotation) axial direction of the recycling roller 2, and the encoding wheel 32 and the recycling roller 2 rotate in opposite directions. The encoding wheel 32 is provided with rotational power by the buffer material 5 as a driven wheel. The rotating length of the buffer material 5 is equal to the length of the rotation of the encoding wheel 32.

The encoder 31 has a rotary shaft connected to the encoding wheel 32 and the encoding wheel 32 is connected to an input end of the controller. The encoding wheel 32 is driven by the buffer material 5 wound around the recycling roller 2 to rotate, and the recycling length of the buffer material 5 wound by the recycling roller 2 during a single time of rotation is measured by the encoder 31. The flexible fixing structure is not limited in structural type as long as the encoding wheel 32 is capable of being elastically abutted against an outermost periphery of the buffer material 5 wound around the recycling roller 2. One end of the flexible fixing structure is fixed on the rack, and the other end is elastically connected to the encoder 31 or the encoding wheel 32. The measuring device in the embodiments utilizes the encoder and the encoding wheel to measure the recycling length of the buffer material with an accurate and reliable measurement and very low manufacturing cost.

In some embodiments, referring to FIG. 1 and FIG. 2, the encoder 31 is further provided with an angle steel frame, the encoder 31 is fixed on the angle steel frame, and the encoding wheel 32 is connected to the rotary shaft of the encoder 31. Equivalently, the encoding wheel 32 is hinged on the angle steel frame. One end of the flexible fixing structure is fixed on the rack, and the other end is elastically connected to the angle steel frame.

In some embodiments, encoder 31 is a photoelectric encoder that is small in size and high in resolution.

In some embodiments, the encoder 31 is an absolute encoder, and each position of the absolute encoder is absolutely unique. No power-down memory is required, no reference point needs to be found, and the anti-interference capability is strong.

In some embodiments, referring to FIG. 1 and FIG. 2, the flexible fixing structure includes a telescopic adjusting element 34 and an elastic element 33. The length of the telescopic adjusting element 34 fixed on the rack is adjustable so that the operator is capable of adjusting the protruding length of the encoding wheel 32 according to different needs so as to further ensure that the encoding wheel 32 is always elastically abutted against an outermost periphery of the buffer material 5. The elastic element 33 in the embodiments is not limited in structural type, and may be a tension spring, a compression spring, an elastic rubber, etc. One end of the elastic element is connected to the telescopic adjusting element 34 and the other end is connected to the encoding wheel 32 or the encoder 31. The telescopic adjusting element 34 in the embodiments is not limited in structural type as long as the length is adjustable, such as a lockable telescopic tube, etc.

In some embodiments, referring to FIG. 1 and FIG. 2, the telescopic adjusting element 34 is specifically a cylinder including a cylinder body and a piston rod. The cylinder body is fixed to the rack, and the piston rod is connected to the elastic element 33. The flexible fixing structure further includes a control valve configured to control the cylinder to adjust a distance between the encoding wheel 32 and the recycling roller 2 in initial debugging. The control valve is in gas communication with the cylinder, and the control valve is electrically connected to the output end of the controller. The operator may adjust the encoding wheel 32 by the controller so as to be elastically abutted against an outermost layer of the buffer material 5.

In some embodiments, the control valve is an electrically controlled servo valve, and the electrically controlled servo valve controls the cylinder more accurately, facilitating the controller to accurately convey the buffer material in the controlling process.

In some embodiments, the telescopic adjusting element 34 includes a sleeve provided with an internal thread and a stud in threaded connection with the sleeve. The sleeve is fixed to the rack, and the stud is connected with the elastic element. The operator may adjust the encoding wheel 32 by rotating the stud in initial debugging so as to be elastically abutted against an outermost layer of the buffer material 5.

In some embodiments, the internal thread of the sleeve is a trapezoidal thread, and the stud is a trapezoidal thread stud. The thread pitch of the trapezoidal thread is generally larger, enabling the operator to quickly adjust the length of the telescopic adjusting element 34.

In some embodiments, the inner thread of the sleeve is a rectangular thread, and the stud is a rectangular thread stud. The thread pitch of the rectangular thread is generally larger, enabling the operator to quickly adjust the length of the telescopic adjusting element 34.

In some embodiments, both the sleeve and the stud are alloy tool steel members, the members made of alloy tool steel material are hard and wear-resistant, and the threads of the sleeve and stud are not easily damaged.

In some embodiments, both the sleeve and the stud are steel members subjected to quenching and tempering treatment. The steel members are hard and wear resistant and have an inexpensive manufacturing cost.

In some embodiments, as a specific implementation of the buffer material conveying and winding device provided by the present application, the elastic element 33 is a compression spring, and has low cost.

In some embodiments, the compression spring is a rectangular compression spring, the rectangular compression spring is rectangular in cross section, resistant to fatigue and durable.

In some embodiments, as a specific implementation of the buffer material conveying and winding device provided by the present application, the controller is a Programmable Logic Controller (PLC) provided with a human-computer interactive touch screen, which is low in cost, simple in operation, and easy to program and interact.

In some embodiments, as a specific implementation of the buffer material conveying and winding device provided by the present application, the controller is an industrial personal computer provided with a human-computer interactive interface. The industrial personal computer is an industrial-grade computer commonly used in the field of industrial control, which is friendly in interface, similar to a common computer, convenient to use, and quick to master.

In some embodiments, as a specific implementation of the buffer material conveying and winding device provided by the present application, the controller is a single chip microcomputer provided with a human-computer interactive interface, which is low in cost.

The purpose of the present application is also to provide a buffer material conveying method for controlling the transmission and recycling of the buffer material in a COG (Chip On Glass) pressing process, which is applied to the buffer material conveying and winding device as described in the above embodiments and includes the following steps:

S10: The controller sets the feeding length of the buffer material 5 conveyed by the feed servo motor during a single time of rotation and the size tolerance of the feeding length so that the recycling torque motor is always in the recycling working state.

S20: The feed servo motor rotates and conveys the unused buffer material 5 in accordance with the feeding length, the recycling torque motor winds the used buffer material 5, and the measuring device measures the recycling length of the recycling torque motor winding the buffer material 5, when it is necessary to remove the used buffer material 5.

S30: The controller judges whether the difference between the recycling length and the feeding length meets the size tolerance of the feeding length, the controller waits for the next cycle of operation, if the difference is within the range of the size tolerance; and the controller controls the alarm to send an alarm, if the difference is greater than the upper deviation of the size tolerance or less than the lower deviation of the size tolerance, and the operator searches for the reason for the deviation of the feeding length and the recycling length and makes adjustments or maintenance after receiving the alarm.

By monitoring the actual recycling length of the buffer material and judging whether the recycling length and the feeding length meet the requirement, the buffer material conveying method provided by the present application is capable of sending an alarm to prompt the operator when the recycling length and the feeding length do not meet the requirement so as to avoid the problem that the buffer material which has passed the service life is repeatedly pressed and the buffer material is wasted.

In some embodiments, as an optimized implementation of the buffer material conveying method provided by the present application, in step S30, the controller judges whether the difference between the recycling length and the feeding length meets the size tolerance of the feeding length, the controller controls the feed servo motor to reversely rotate and pull back the buffer material conveyed excessively if the difference is greater than the upper deviation of the size tolerance, the recycling torque motor is also driven to reversely rotate at this time, until the controller judges that the difference between the recycling length and the feeding length after the reversing operation is within the range of the size tolerance by the measuring device, and then the feed servo motor stops reversely rotating and waits for the next cycle of operation.

The controller controls the feed servo motor to continue to convey the buffer material, if the difference is less than the lower deviation of the size tolerance, until the difference between the recycling length and the feeding length is within the range of the size tolerance, and then the feed servo motor stops reversely rotating. If the difference is within the range of the size tolerance, the feed servo motor will stop operating and wait for the next cycle of operation. In the present embodiment, the controller judges that the difference between the recycling length and the feeding length does not meet the range of the size tolerance, and may send an alarm to prompt the operator. At the same time, the controller controls the operation of the feed servo motor to realize intelligent compensation of the recycling length, which not only avoids the problem that the buffer material which has passed the service life is repeatedly pressed and the buffer material is wasted, but also is more automated. The pressing operation is not affected so that the pressing operation is more continuous.

It should be pointed out herein that when the controller judges that the difference between the recycling length and the feeding length does not meet the range of the size tolerance, an alarm is sent to prompt the operator to inform the operator that there is an abnormality in the conveyance this time, but the device itself also performs intelligent compensation. Of course, the alarm may be set not to send an alarm when the controller judges that the difference between the recycling length and the feeding length does not meet the range of the size tolerance, but the subsequent recycling length compensation operation is still normally executed.

Another object of the present application is to provide an assembly binding system, including: the buffer material conveying and winding device described above, a buffer material 5 and a pressing head device 4. One end of the buffer material 5 is wound around the feed roller 1 and the other end is wound around the recycling roller 2. The controller is electrically connected to the pressing head device and coordinates the operation of the buffer material conveying and winding device and the pressing head device 4.

Compared with the prior art, the assembly binding system provided by the present application is provided with a measuring device configured to detect the recycling length of the buffer material wound by the recycling roller during a single time of rotation, a controller configured to judge whether the recycling length and the feeding length meet the requirement, and an alarm. The alarm is capable of sending an alarm to prompt the operator when the recycling length and the feeding length do not meet the requirement so as to avoid the problem that the buffer material which has passed the service life is repeatedly pressed and the buffer material is wasted.

The above description is only the optional embodiments of the present application, and not intended to limit the present application. Any modification, equivalent replacement and improvement made within the spirit and principle of the present application should be included within the scope of protection of the present application.

What is claimed is:

1. A buffer material conveying and winding device, comprising:
    a rack, which is configured as a main frame of the buffer material conveying and winding device and is fixed at the buffer material conveying and winding device;
    a feed roller, which is fixed to the rack and configured to convey the buffer material, wherein the unused part of the buffer material is wound around the feed roller;
    a feed servo motor, which is fixed to the rack and configured to provide rotational power to the feed roller;
    a recycling roller, which is fixed to the rack and configured to recycle the buffer material, wherein the used part of the buffer material is wound around the recycling roller;
    a recycling torque motor, which is fixed to the rack and configured to provide rotational power to the recycling roller, wherein the recycling torque motor is capable of locking rotation, and the recycling torque motor is capable of rotating and driving the recycling roller to wind and recycle the buffer material when the buffer material is in a relaxed state;
    a measuring device, which is connected to the rack and configured to measure the recycling length of the buffer material wound by the recycling roller when the feed servo motor rotates the feed for a single time;
    a controller, wherein an input end of the controller is electrically connected to the measuring device, an output end of the controller is electrically connected to the feed servo motor, and the controller is configured to coordinate the operation of the buffer material conveying and winding device with the pressing operation of a chip on glass; and
    an alarm, which is electrically connected to the output end of the controller and configured to prompt the operator in the abnormal situation.

2. The buffer material conveying and winding device according to claim 1, wherein the measuring device comprises:
    an encoding wheel which is elastically abutted against an outermost periphery of the buffer material wound around the recycling roller, wherein the encoding wheel is provided with rotational power by the buffer material, the encoding wheel is in parallel with the recycling roller in an axial direction thereof, and the encoding wheel and the recycling roller rotate in opposite directions;
    an encoder, which has a rotary shaft connected to the encoding wheel and is connected to an input end of the controller, wherein the encoding wheel is driven by the buffer material wound around the recycling roller to rotate, and the recycling length of the buffer material wound by the recycling roller during a single time of rotation is measured by the encoder; and
    a flexible fixing structure, one end of which is fixedly provided on the rack, and the other end is elastically connected to the encoder or the encoding wheel, wherein the flexible fixing structure is configured to keep the encoding wheel elastically abutted against the outermost periphery of the buffer material wound around the recycling roller.

3. The buffer material conveying and winding device according to claim 2, wherein the encoder is a photoelectric encoder or an absolute encoder.

4. The buffer material conveying and winding device according to claim 2, wherein the flexible fixing structure comprises:

a telescopic adjusting element, which is fixedly provided on the rack, wherein the telescopic adjusting element has an adjustable length; and an elastic element, one end of which is connected to the telescopic adjusting piece, and the other end is connected to the encoding wheel.

5. The buffer material conveying and winding device according to claim 4, wherein the elastic element is a compression spring.

6. The buffer material conveying and winding device according to claim 1, wherein the controller is a programmable controller provided with a human-computer interactive touch screen.

7. The buffer material conveying and winding device according to claim 1, wherein the controller is an industrial personal computer or a single chip microcomputer provided with a human-computer interactive interface.

8. An assembly binding system, comprising:
the buffer material conveying and winding device according to claim 1;
a buffer material, one end of which is wound around the feed roller and the other end is wound around the recycling roller; and
a pressing head device electrically connected to the controller.

9. The assembly binding system according to claim 8, wherein the measuring device comprises:
an encoding wheel which is elastically abutted against an outermost periphery of the buffer material wound around the recycling roller, wherein the encoding wheel is provided with rotational power by the buffer material, the encoding wheel is in parallel with the recycling roller in an axial direction thereof, and the encoding wheel and the recycling roller rotate in opposite directions;
an encoder, which has a rotary shaft connected to the encoding wheel and is connected to an input end of the controller, wherein the encoding wheel is driven by the buffer material wound around the recycling roller to rotate, and the recycling length of the buffer material wound by the recycling roller during a single time of rotation is measured by the encoder; and
a flexible fixing structure, one end of which is fixedly provided on the rack, and the other end is elastically connected to the encoder or the encoding wheel, wherein the flexible fixing structure is configured to keep the encoding wheel elastically abutted against the outermost periphery of the buffer material wound around the recycling roller.

* * * * *